United States Patent [19]

Crema

[11] Patent Number: 4,712,897
[45] Date of Patent: Dec. 15, 1987

[54] DEVICE FOR ADJUSTMENT OF THE VIEWFINDER EYEPIECE OF A CAMERA

[75] Inventor: Rolf Crema, Greifenthal, Fed. Rep. of Germany

[73] Assignee: Ernst Leitz Wetzlar GmbH, Wetzlar, Fed. Rep. of Germany

[21] Appl. No.: 887,226

[22] Filed: Jul. 21, 1986

[30] Foreign Application Priority Data

Jul. 27, 1985 [DE] Fed. Rep. of Germany ....... 3526938

[51] Int. Cl.⁴ .............................................. G03B 13/06
[52] U.S. Cl. .................................... 354/219; 350/255
[58] Field of Search ............... 354/199, 200, 201, 219, 354/224, 225, 286; 350/255, 579, 580

[56] References Cited

U.S. PATENT DOCUMENTS

| 3,669,523 | 6/1972 | Edwards | 350/579 |
| 4,164,369 | 8/1979 | Urano et al. | 350/255 |
| 4,268,151 | 5/1981 | Kobori et al. | 354/219 |
| 4,381,892 | 5/1983 | Someya | 354/219 |
| 4,384,767 | 5/1983 | Kawai | 350/580 |

FOREIGN PATENT DOCUMENTS 2824334 7/1978 Fed. Rep. of Germany .

Primary Examiner—A. A. Mathews
Attorney, Agent, or Firm—Schwartz, Jeffery, Schwaab, Mack, Blumenthal & Evans

[57] ABSTRACT

The device according to the invention for adjustment of the viewfinder eyepiece of a camera incorporates a radial cam/lever mechanism which can be actuated manually. It acts on the eyepiece, which is mounted so that it can be moved in an axial direction.

11 Claims, 4 Drawing Figures

DEVICE FOR ADJUSTMENT OF THE VIEWFINDER EYEPIECE OF A CAMERA

BACKGROUND OF THE INVENTION

The invention relates to a device for adjustment of the viewfinder eyepiece of a camera.

Devices which displace the eyepiece along its optical axis are necessary in order to be able to compensate for the defective vision of the camera user. This vision compensation is known as a diopter correction.

German Utility Model No. 1,830,283, discloses a direct-vision viewfinder for photographic cameras in which the diopter correction can be carried out on the eyepiece by means of a worm gear.

Furthermore, a diopter adjustment device for single-lens reflex cameras with an interchangeable viewfinder is described in German Offenlegungsschrift No. 2,824,334. The adjustment device has an eyepiece holder for securing the eyepiece that is arranged in the viewfinder so that the eyepiece holder can slide along the optical axis of the eyepiece. Additionally, the drive device that displaces the eyepiece holder from the outside of the camera is covered when the viewfinder is attached to the camera.

The disadvantage of both the direct vision viewfinder and the single-lens reflex camera devices is, however, that the diopter correction, once set, cannot be fixed or secured and the adjustment setting cannot be reproduced with certainty.

German Utility Model No. 1,994,235, discloses a viewfinder eyepiece which is mounted so that the viewfinder can be displaced axially by the effect of a spring. The spring forces the eyepiece out of the camera body to an end position which is limited by a stop. The eyepiece can be moved against the spring force into a position which compensates for the defective vision of the user by pressing a button. The eyepiece can be fixed in this position by means of a catch device.

The disadvantage of this device includes the fact that the adjustment setting cannot be reproduced with certainty. This device also lacks adequate adjustment accuracy.

SUMMARY OF THE INVENTION

It is therefore an object of the present invention to provide an improved device, for adjustment of the viewfinder eyepiece of a camera.

A particular object of the invention resides in providing such a device in which the correction adjustment and the reproducibility of the adjustment succeed with high accuracy. It is also an object of the invention to provide such a device in which easy removal of the eyepiece from the camera for cleaning purposes is possible.

Still another object of the invention resides in providing a camera which incorporates the improved viewfinder eyepiece adjusting mechanism of the invention.

In accordance with one aspect of the present invention, these objects are achieved by provision of a device for adjusting a viewfinder eyepiece of a camera having a viewfinder eyepiece mounted in an axially movable manner in the camera, and means, including a radial cam and a lever operatively connected between the radial cam and the viewfinder eyepiece, for axially displacing the viewfinder eyepiece.

These objects are further achieved, in accordance with another aspect of the present invention, by provision of a device for adjusting a viewfinder eyepiece of a camera having an eyepiece comprising two lenses and means for mounting said lenses so as to be moveable in an axial direction relative to one another; and means for axially displacing said lenses relative to one another and for reproducibly fixing the displacement of the lenses in any desired adjustment setting.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is represented schematically in the drawing in an illustrative embodiment and described in greater detail below. In the drawing.

DETAILED DESCRIPTION OF THE PREFERRED EMBODIMENTS

According to the invention, a device for adjusting the viewfinder eyepiece incorporates a radial cam/lever mechanism which can be actuated manually and which acts on the eyepiece. The eyepiece is mounted so that it can move in the axial direction. Furthermore, means are provided for easy manual detachment of the eyepiece.

Figure 1:
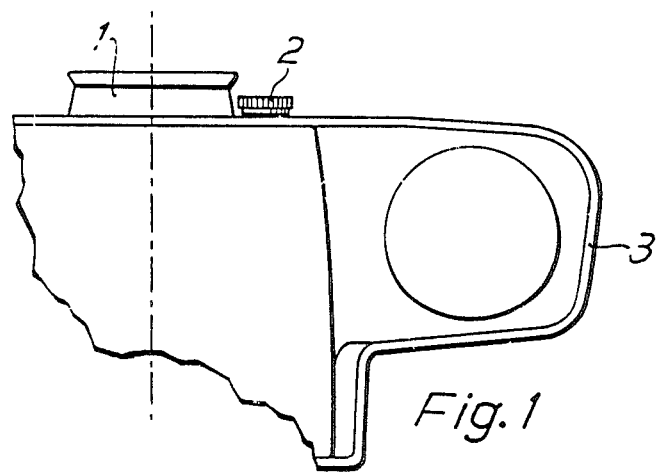
FIG. 1 shows a camera cover plate with eyepiece and adjustment device according to the invention.

The arrangement of an eyepiece 1 relative to an adjustment device 2 in a camera cover plate 3 is represented in FIG. 1.

Figure 2:
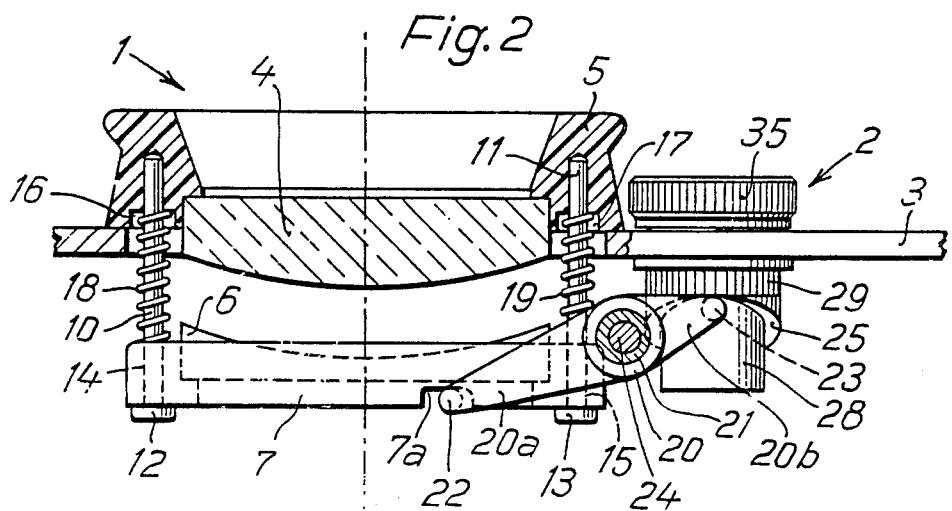
FIG. 2 is a view, partially in section, showing the eyepiece adjustment mechanism in detail.

Since an eyepiece adjustment mechanism is intended to be used for compensation of defective vision of camera users, the eyepiece 1 is designed in two parts, as FIG. 2 shows. The eyepiece comprises a rear lens 4, which is rigidly mounted to the rear of an eyepiece plate 5, and a front lens 6, which is supported by a lens holder 7.

Figure 3:
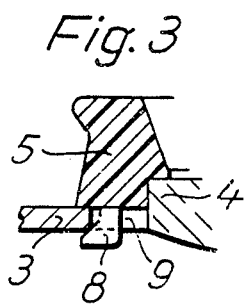
FIG. 3 is an isolated cross-sectional view showing the attachment of the eyepiece to the camera cover plate.

This two-part eyepiece 1 is secured to the cover plate 3 by means of snap-action hooks 8 (FIG. 3) which are positioned on the rear of the eyepiece plate 5. The snap-action hooks 8 engage an aperture 9 in the cover plate 3. The eyepiece can be easily removed from the cover plate of the camera by disengaging the snapaction hooks.

In order that the lenses 4 and 6 can be displaced relative to one another, guide pins 10, 11 that have limiting heads 12, 13 are arranged parallel to one another and secured to the rear of the eyepiece plate 5. The lens holder 7 is provided with bore holes 14 and 15 which accept the guide pins 10, 11. Compression springs 18, 19, which are guided by the guide pins 10, 11 and supported in clearing holes 16, 17, press the lens holder 7 against the limiting heads 12 and 13.

The adjustment device 2 includes a two-arm lever 20. This lever is mounted to and can swivel about a shaft 21.

By means of a contact pin 22 which is fixed on one arm 20a, the lever 20 engages a recess 7a in the lens holder 7. By means of a profile tracer pin 23 located on arm 20b, the other arm 20b of the lever 20 rests on a radial cam 25 of the adjustment device 2. The adjustment device 2 is rotatably mounted in the cover plate 3.

In order to ensure that the contact pin 22 and the profile tracer pin 23 rest securely, the shaft 21 of the two-arm lever 20 is additionally provided with a cam 24, with which the position of the lever 20 can be adjusted in relation to the cover plate 3, the recess 7a and the radial cam 25.

Figure 4:
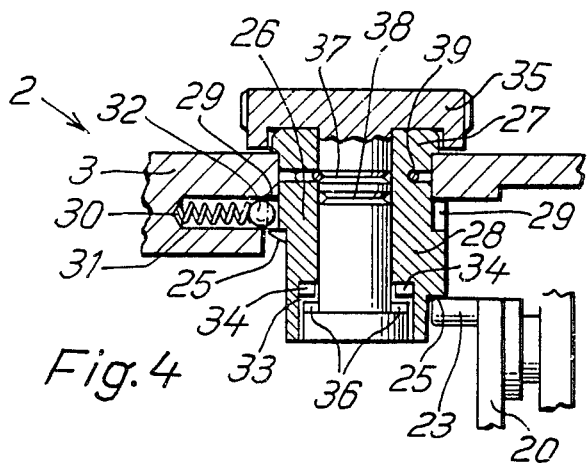
FIG. 4 if a sectional view showing the adjustment device in detail.

The adjustment device 2, which controls the adjustment of the lens holder 7 via the two-arm lever 20, is designed essentially in two parts. The adjustment device 2 comprises a sleeve 26 (FIG. 4) that has a flange 27 at the upper end and a cylinder 28. The end of cylinder 28 that projects into the cover plate 3 has the same diameter as the flange 27. The flange 27 and the cylinder 28 have the effect that the sleeve 26 is mounted in the cover plate 3 so that it can be rotated, but not displaced axially.

The camera side end of the cylinder 28 is provided with the radial cam 25. Click grooves 29 are provided around the circumference of the end of the cylinder 28 adjacent the cover plate. A ball 32 which is under the pressure of a spring 30 and is guided in a guide bore hole 31 engages a click groove 29, forming a click-catch device.

In addition, a recess 33, the base of which is provide with coupling elements 34, is provided in the camera side end of the sleeve 26.

The shaft of an actuating knob 35 is arranged in the sleeve 26, and the upper end of the actuating knob that projects beyond the front of the cover plate 3 encompasses the flange 27 of the sleeve 26 in a cap-like manner. The lower end of the actuating knob lies in the recess 33 of the sleeve 26 and is fitted with coupling elements 36 which lie opposite the coupling elements 34 and correspond to the latter.

A click-stop facility which includes click grooves and a catch spring is located between the upper and lower ends of the actuating knob shaft. The shaft of the actuating knob 35 has circumferential grooves 37 and 38 that can engage a catch spring 39 which is arranged in the sleeve 26.

To adjust the eyepiece, the actuating knob 35 is pulled out from a rest position in the sleeve 26 to an adjustment position. The catch spring 39 thereby clicks into the click groove 38, and the coupling elements 34 and 36 come into contact with one another. When the actuating knob 35 is turned, the sleeve 26 and the radial cam 25 also turn with it. The lever 20 is swivelled about the shaft 21 in accordance with the stroke movement of the radial cam 25. As a result of this procedure, the lens holder 7 which supports rear lens 6 is either displaced against the force of the springs 18, 19 or returned by the latter to the starting position in which the lens holder is pressed against the limiting heads.

During the rotation of the actuating knob 35 when in the adjustment position, the ball 32 successively engages the click grooves 29. When the desired eyepiece adjustment has been reached, the actuating knob 35 is pushed back into the rest position. The catch spring 39 thereby clicks into the click groove 37 and the coupling elements 34, 36 decouple. The eyepiece adjustment setting, which is maintained by the interaction of the click groove 29 and the ball 32 of the click-catch device, cannot be moved by the actuating knob when it is in its rest position.

The particular advantages of the device for adjusting the viewfinder eyepiece of a camera according to the invention reside in the fact that, in addition to a diopter adjustment which can be engaged or disengaged and arrested in any desired setting, the entire eyepiece can be easily removed from the cover plate of the camera for cleaning purposes.

What is claimed is:

1. A device for adjusting a viewfinder eyepiece of a camera, comprising:
    a viewfinder eyepiece mounted in an axially movable manner in the camera, and
    means for axially displacing the viewfinder eyepiece, wherein said axial displacing means comprises:
    an actuating knob which has a shaft;
    a sleeve surrounding said shaft and which is normally rotatable with respect to said shaft, said sleeve including a radial cam;
    a lever operatively connected between the radial cam and the viewfinder eyepiece; and
    means for selectively coupling and decoupling said shaft to said sleeve.

2. A device as claimed in claim 1, wherein said shaft and said sleeve are axially slideable with respect to one another, and said coupling and decoupling means includes means for switching said actuating knob and its shaft between a first axial adjustment position and a second axial rest position.

3. A device as claimed in claim 2, wherein said switching means includes a catch device for arresting the shaft in said first and second axial positions relative to said sleeve.

4. A device as claimed in claim 1, further comprising means for fixing the rotational position of said sleeve with respect to said sleeve.

5. A device as claimed in claim 4, wherein said fixing means comprises a plurality of detents around the circumference of said sleeve and a spring-biased catch mechanism secured to the camera for engaging in said detents.

6. A device as claimed in claim 1, wherein said lever comprises a two-arm lever rotatably mounted about a shaft secured to the camera, said lever having a first arm which includes a contact pin for engaging a recess of said eyepiece, and said lever having a second arm which includes a cam follower which rests on said radial cam.

7. A device as claimed in claim 1, wherein said mounted eyepiece includes means for manually detaching said eyepiece from said camera.

8. A device as claimed in claim 7, wherein said eyepiece includes snap-action hooks positioned on the rear of said eyepiece which engage an aperture of a cover plate of said camera.

9. A device for adjusting a viewfinder eyepiece of a camera comprising:
    an eyepiece comprising front and rear lenses and means for mounting said lenses so as to be moveable in an axial direction relative to one another, said mounting means comprising an eyepiece plate positioned behind the rear lens, at least two guide pins extending from said eyepiece plate toward the front lens and having limiting heads at their distal ends, said pins being parallel to one another and secured to said eyepiece plate, a compression spring surrounding each of said guide pins and being supported in clearing holes of said eyepiece plate, and a lens holder supporting the front lens, said lens holder having bore holes which accept said guide pins, such that said compression springs press said lens holder against said limiting heads; and means for axially displacing said lenses relative to one another and for reproducibly fixing the displacement of the lenses in any desired adjustment setting.

10. A device as claimed in claim 9, wherein said axial displacing means comprises:

an actuating knob which has a shaft;

a sleeve surrounding said shaft and which is normally rotatable with respect to said shaft, said sleeve including a radial cam;

a lever operatively connected between the radial cam and the front lens; and means for selectively coupling and decoupling said shaft to said sleeve.

11. A device for adjusting a viewfinder eyepiece of a camera, comprising:

a viewfinder eyepiece mounted in an axially movable manner in the camera and having snap-action hooks positioned on its rear engageable and disengageable with an aperture of a cover plate of the camera so that the viewfinder eyepiece can be manually attached and detached from the camera; and means, including a radial cam and a lever operatively connected between the radial cam and the viewfinder eyepiece, for axially displacing the viewfinder eyepiece.

* * * * *